US009262093B1

(12) United States Patent
Greenfield et al.

(10) Patent No.: US 9,262,093 B1
(45) Date of Patent: Feb. 16, 2016

(54) PRIORITIZED RATE SCHEDULER FOR A STORAGE SYSTEM (71) Applicant: GOOGLE INC., Mountain View, CA (US)

(72) Inventors: Lawrence E. Greenfield, New York, NY (US); Alexander Khesin, Hoboken, NJ (US)

(73) Assignee: Google Inc., Mountain View, CA (US)

( * ) Notice: Subject to any disclaimer, the term of this patent is extended or adjusted under 35 U.S.C. 154(b) by 232 days.

(21) Appl. No.: 14/107,349

(22) Filed: Dec. 16, 2013

Related U.S. Application Data (63) Continuation of application No. 13/280,883, filed on Oct. 25, 2011, now Pat. No. 8,612,990.

(51) Int. Cl.
G06F 9/46 (2006.01)
G06F 15/173 (2006.01)
G06F 3/06 (2006.01)

(52) U.S. Cl.
CPC .............. G06F 3/0653 (2013.01); G06F 3/061 (2013.01); G06F 3/067 (2013.01)

(58) Field of Classification Search
None
See application file for complete search history.

(56) References Cited

U.S. PATENT DOCUMENTS

| | | | |
|---|---|---|---|
| 5,889,956 A * | 3/1999 | Hauser | G06F 15/17375 709/226 |
| 6,434,559 B1 * | 8/2002 | Lundberg | H04L 47/10 |
| 7,530,072 B1 * | 5/2009 | Cheaz | G06F 9/5027 712/216 |
| 7,584,475 B1 * | 9/2009 | Lightstone | G06F 9/50 348/14.01 |
| 7,668,966 B2 * | 2/2010 | Klinker | H04L 45/00 709/230 |
| 7,702,779 B1 | 4/2010 | Gupta et al. | |
| 7,747,723 B2 | 6/2010 | Ogawa et al. | |
| 7,984,151 B1 | 7/2011 | Raz et al. | |
| 8,149,699 B2 | 4/2012 | Kim et al. | |
| 8,612,990 B1 | 12/2013 | Greenfield et al. | |
| 9,008,673 B1 * | 4/2015 | Sanjeev | H04L 43/16 370/229 |
| 2002/0041606 A1 * | 4/2002 | Chin | H04L 47/13 370/468 |
| 2004/0199635 A1 | 10/2004 | Ta et al. | |
| 2004/0236740 A1 | 11/2004 | Cho et al. | |
| 2005/0177538 A1 | 8/2005 | Shimizu et al. | |
| 2005/0240934 A1 * | 10/2005 | Patterson | G06F 3/0613 718/105 |
| 2007/0081554 A1 | 4/2007 | Saffre | |

(Continued)

OTHER PUBLICATIONS

Golestani; "A Self-Clocked Fair Queueing Scheme for Broadband Applications;" Proc. Infocom'94, Apr. 1994, pp. 636-646.

(Continued)

Primary Examiner — Adam Lee
(74) Attorney, Agent, or Firm — Lerner, David, Littenberg, Krumholz & Mentlik, LLP (57) ABSTRACT A storage system may include a set of storage devices; a controller; and a management device. The controller may arbitrate among operations for execution by the set of storage devices, where the operations are received from users that are associated with priority levels. The controller may maintain queues, corresponding to the users, to queue operations from the users. The controller may additionally include a scoring component and a scheduler. The scoring component may maintain a score for each queue. The scheduler may choose, from the queues and based on the score of each queue, one of the operations to service. The management device may receive usage updates, from the controller, reflecting usage of the set of storage devices; calculate a maximum allowed usage levels, based on the received usage updates, for each user; and transmit the calculated maximum usage levels to the controller.

18 Claims, 8 Drawing Sheets

(56) References Cited

U.S. PATENT DOCUMENTS

| | | |
|---|---|---|
| 2007/0101334 A1 | 5/2007 | Atyam et al. |
| 2007/0133409 A1 | 6/2007 | McKinnon et al. |
| 2007/0245423 A1* | 10/2007 | Herington ............... G06F 21/10 726/31 |
| 2008/0112429 A1 | 5/2008 | McKinnon et al. |
| 2008/0244576 A1* | 10/2008 | Kwon ................... G06F 9/5016 718/1 |
| 2009/0245115 A1 | 10/2009 | Krishnaswamy et al. |
| 2009/0282346 A1 | 11/2009 | Bechtel et al. |
| 2010/0192213 A1 | 7/2010 | Ta et al. |
| 2010/0217558 A1 | 8/2010 | Tan et al. |
| 2010/0229218 A1 | 9/2010 | Kumbalimutt et al. |
| 2010/0299447 A1* | 11/2010 | Salvi ................... G06F 11/2074 709/233 |
| 2010/0325327 A1 | 12/2010 | Marietta et al. |
| 2011/0069666 A1 | 3/2011 | Kahn et al. |
| 2011/0087777 A1 | 4/2011 | Sakai et al. |
| 2012/0233325 A1 | 9/2012 | Zhou et al. |

OTHER PUBLICATIONS

Goyal et al.; "Start-time Fair Queuing: A Scheduling Algorithm for Integrated Services Packet Switching Networks;" Proc. ACM-SIGCOMM'96, Palo Alto, CA, Aug. 1996, pp. 157-168.

Bennett et al.; "WB$^2$Q: Worst-case Fair Weighted Fair Queueing;" Proc. IEEE Infocom'96, San Francisco, CA; Mar. 1996, pp. 120-128.

Duda et al.; "Borrowed-Virtual-Time (BVT) scheduling: supporting latency-sensitive threads in a general-purpose schedule;" SOSP-17; Kiawah Island, South Carolina, Dec. 1999, 16 pages.

Ghemawat et al.; "The Google File System;" SOSP'03, Bolton Landing, New York, Oct. 19-22, 2003, 15 pages.

* cited by examiner

Fig. 8

PRIORITIZED RATE SCHEDULER FOR A STORAGE SYSTEM

RELATED APPLICATION

This application is a continuation of U.S. patent application Ser. No. 13/280,883, filed Oct. 25, 2011 (now U.S. Pat. No. 8,612,990), the disclosure of which is incorporated herein by reference.

BACKGROUND

Certain computing applications, such as a large, distributed, data-intensive applications, may access data provided by a distributed storage system made up of numerous storage devices or clusters of storage devices. For example, a particular storage system may include hundreds or thousands of storage devices that may be accessed by a number of client applications or users. The storage system may perform constant monitoring and error detection to obtain fault tolerant operation.

It may be desirable, with a distributed storage system, to provide fair access, to the storage devices, by the client applications.

SUMMARY

A computing device implemented method may include receiving, by the device, operations for a storage device, from a number of users associated with priorities; monitoring, by the computing device, usage levels of the storage device, for the users; determining, by the computing device, scores for a particular user, based on the usage level of the particular user, a target usage level for the particular user that defines an allotted usage level of the storage device and for the particular user, a maximum allowed usage level for the particular user, and a priority of the particular user. The method may further include selecting one of the received operations, based on the scores; and transmitting the selected one of the received operations, to the storage device.

In another implementation, a storage system may include a set of storage devices and a controller to arbitrate among operations for execution by the set of storage devices, where the operations are received from users that are associated with priority levels. The controller may include: a number of queues, corresponding to the users, to queue operations from the users; a scoring component to maintain a score for each queue of the queues, where the score is calculated based on usage of storage devices in the set of storage devices by a particular user of the users, a target usage level for the particular user that defines an allotted usage level of the set of storage devices by the particular user, a maximum allowed usage level for the particular user, and the priority level for the particular user. The controller may also include an arbitrator to choose, from the queues and based on the score of each queue, one of the operations to service. The storage system may further include a management device, coupled to the controller. The management device may receive usage updates, from the controller, reflecting usage of the set of storage devices, by the users. The management device may further calculate maximum allowed usage levels, for the users, based on the received usage updates, and transmit the calculated maximum usage levels to the controller.

In yet another implementation, a device may include at least one storage interface to connect to storage devices; one or more network interfaces to receive operations, from a number of users, for access to the storage devices, where each of the users is associated with a priority level; and at least one processor. The processor operate to: maintain a number of queues, associated with the users, to store the received operations; monitor usage levels, of the storage devices, by the users; determine scores for the users, each score being based on a usage level of a particular user, a target usage level for the particular user that defines an allotted amount of storage device usage for the particular user, a maximum allowed usage level for the particular user, and a priority level of the particular user; and select one of the received operations, stored in the queues, based on the scores, where the selected one of the received operations is granted access to the corresponding one or more of the storage devices.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements.

Overview

Figure 1:
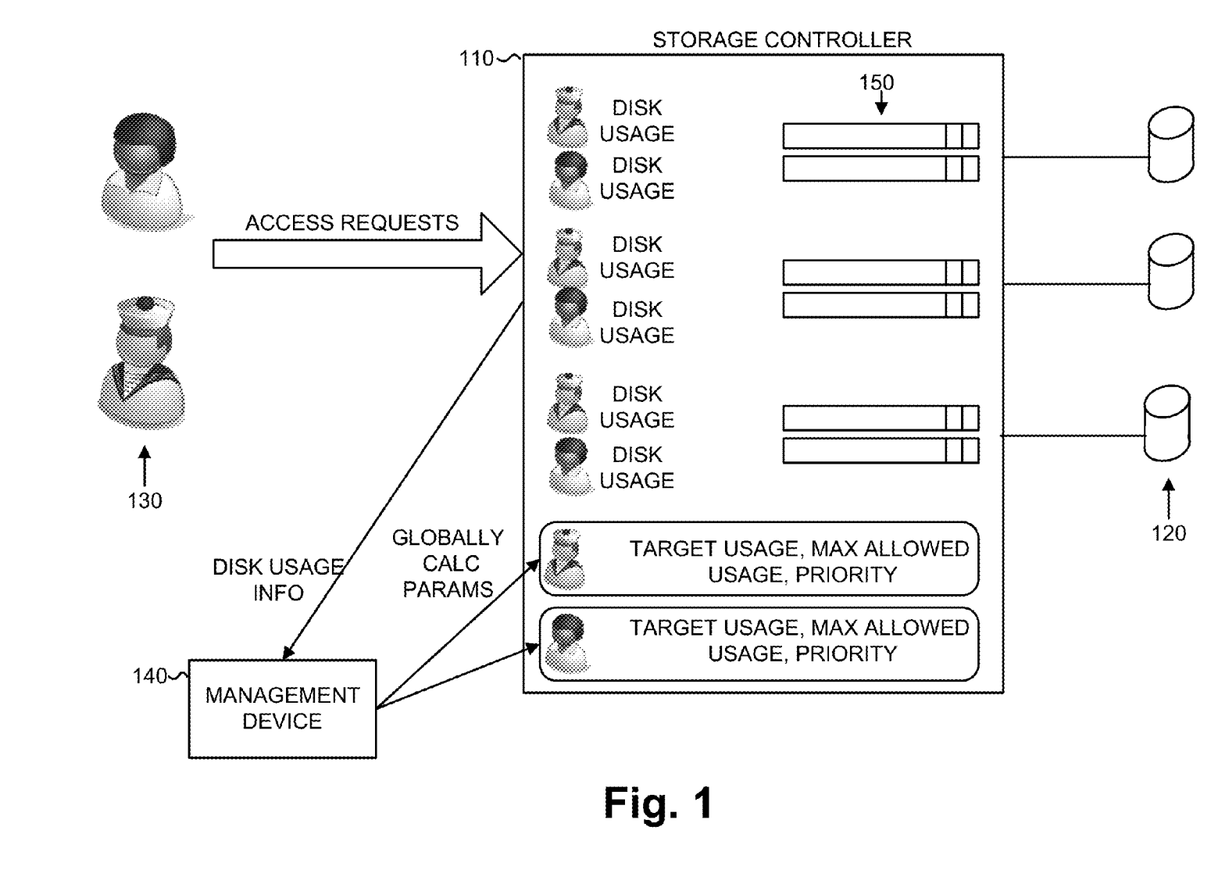
FIG. 1 is a diagram conceptually illustrating the operation of an example storage system.

FIG. 1 is a diagram conceptually illustrating the operation of an example storage system. In this example, a single storage controller 110 controls three disk drives 120. Disk drives 120 are illustrated as being accessed by two users 130. Users 130 may, for example, transmit storage write requests or read requests to storage controller 110, which may forward the requests to the appropriate one of disk drives 120.

A particular disk drive 120 may be only able to handle a single access request, such as a read request or a write request, at a time. An access request will be generally referred to herein as an operation. In situations in which multiple operations are received from multiple users 130, the number of operations could potentially overwhelm the disk drive 120 and/or cause the operations of one of users 130 to be blocked by the operations of the other one of users 130. To handle this situation, storage controller 110 may arbitrate between operations. The arbitration may include storing incoming requests in queues 150, each of which may be associated with a particular user 130 and scheduling operations, from the queues 150 and for a disk drive 120, in a particular order. As described in more detail herein, the particular order may be based on a usage quota (TARGET USAGE) assigned to each user, and a maximum allowed usage level (MAX ALLOWED USAGE) assigned to each user, and a priority level (PRIORITY) assigned to each user. These values may be received from a management device 140. Management device 140 may calculate these values based on usage information (i.e., information quantifying how much a particular user has, in the recent past, accessed one or more of disk drives 120) that is transmitted from storage controller 110 to management device 140.

The scheduling technique discussed herein may be particularly suited to operations from non-coordinated users, in which different users may be associated with different priorities and in which it may be desirable to assign different target usage quotas for different users (e.g., a first user may be allocated 10% of the total disk throughput of the storage system while another may be allocated 5%). The scheduling technique may provide fair access to different users while allowing operation bursts at the local storage device level.

The terms "users" or "clients," as used herein, may refer to entities that generate operations, such as read or write requests, that are to be serviced by storage devices. The entity that generates the operations may include a particular application or application type. For example, a server-based email application may be considered to be a single user for the purpose of the storage system. Even though the email application may provide email services to accounts (e.g., millions of human users), the email application may be considered to be a single user by the storage system. In this situation, there may be a relatively small number of users, where each user may refer to a particular application or service, such as an email service, a web indexing service, etc. Alternatively, in some implementations, a user or client may refer to each individual that accesses the storage system.

System Overview

Figure 2:
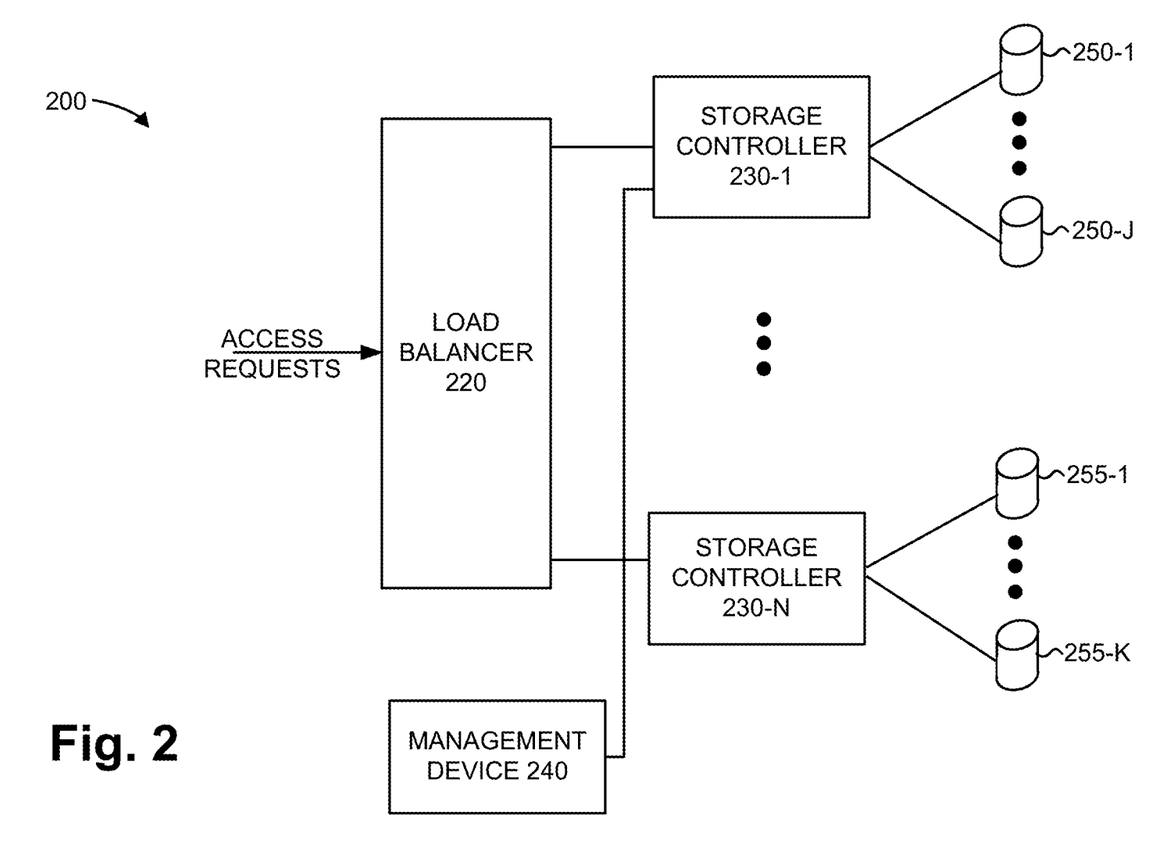
FIG. 2 is a block diagram of an example storage system.

FIG. 2 is a diagram of an example storage system 200. Storage system 200 may generally implement a distributed storage system in which data may be written and/or read. Storage system 200 may include a load balancer 220, storage controllers 230-1 through 230-N (N≥1) (referred to collectively as "storage controllers 230" or individually as "storage controller 230"), a management device 240, and one or more storage devices connected to each storage controller. The storage devices are illustrated as storage devices 250-1 through 250-J (J≥1) (referred to collectively as "storage devices 250" or individually as "storage devices 250"), which may connect to and be controlled by storage controller 230-1, and storage devices 255-1 through 255-K (K≥1) (referred to collectively as "storage devices 255" or individually as "storage device 255"), which may connect to and be controlled by storage controller 230-N.

Load balancer 220 may receive operations from a number of users. The operations may include read requests and/or write requests for data. In some situations, such as for a write operation, load balancer 220 may balance the received operations over storage devices 250/255, such as by randomly selecting a storage device 250/255 to handle the operation. In other situations, such as for a read operation, the particular storage device to handle the operation may be included as part of the operation or looked-up by load balancer 220 (or another device). In either situation, load balancer 220 may forward the received operations to the corresponding one or more storage controllers 230, which may schedule the operations for delivery to storage devices 250/255.

In some implementations, load balancer 220 may be omitted or may be bypassed for certain operations. For instance, as mentioned previously, for read operations, the user issuing the read operation may know the storage devices 250/255 and/or storage controller 230 to which the read operation should be directed and may thus issue the read operation directly to the appropriate storage controller 250. Write operations may similarly be issued directly to a storage controller 230 and/or storage device 250/255. For example, the user may be told that the next 8 MB (or another quantity) of write operations are to be issued to particular storage device 250/255 or storage controller 250.

Storage controllers 230 may include computing devices to receive the operations from load balancer 220. As will be described in more detail below, storage controllers 230 may maintain queues corresponding to each user, priority level, and/or storage device, and use the queues to prioritize the scheduling of operations to the appropriate storage devices 250/255. In one implementation, each queue may correspond to operations for a particular storage device, from a particular user, and having a particular priority level. A storage controller 230 may calculate a score for each queue, and choose operations from the queues based on the scores. In this manner, storage controller 230 may act as a prioritized rate scheduler that determines the order in which operations, received for a particular storage device, are sent to that storage device.

Management device 240 may include one or more computing devices that provide a global level of control over storage controllers 230. Management device 240 may transmit parameters relating prioritized rate scheduling to storage controllers 230. The parameters may be calculated based on information received from storage controllers 230. For example, storage controllers 230 may periodically send usage information to management device 240, where the usage information quantifies how much of each of storage devices 250/255 was accessed by each user or each queue. In one implementation, the usage information may be transmitted, by storage controllers 230, at periodic intervals (e.g., every 10 seconds usage update messages may be sent to management device 240). In another implementation, storage controller 230 may send information when requested. Based on the usage information, management device 240 may calculate the parameters relating to prioritized rate scheduling (as performed by storage controllers 230). In some implementations, multiple management devices 240 may collaborate in determining the global parameters.

The parameters may include, for example, a maximum allowed usage level for a user or queue and a target usage level for the user or queue. Other parameters, such as the priority level assigned to each user may, at certain times (e.g., during system initialization), also be transmitted by the management device 230 to the storage controllers 230.

Storage devices 250/255 may include any type of storage device, such as a hard disk drive, flash drive, writeable optical drive, dynamic random access memory (DRAM), other volatile storage, etc. A number of storage devices 250/255 may be coupled to each storage controller 230. For example, storage controller 230-1 may control ten storage devices (i.e., J=10) and storage controller 230-N may control seven storage devices (i.e., K=7). In one implementation, storage devices 250/255 may include commodity storage devices, such as hard disk drives designed for consumer use.

Although FIG. 2 shows example components of storage system 200, in other implementations, storage system 200 may contain fewer components, different components, differently arranged components, and/or additional components than those depicted in FIG. 2. Alternatively, or additionally, one or more components of storage system 200 may perform one or more other tasks described as being performed by one or more other components of storage system 200. For example, in FIG. 2, load balancer 220 is illustrated as being directly connected to storage controllers 230 and storage controllers 230 are illustrated as being directly connected to storage devices 250/255. In alternative implementations, one or more networks, such as local Ethernet networks, fiber channel, or InfiniBand networks may be used to connect these devices.

Figure 3:
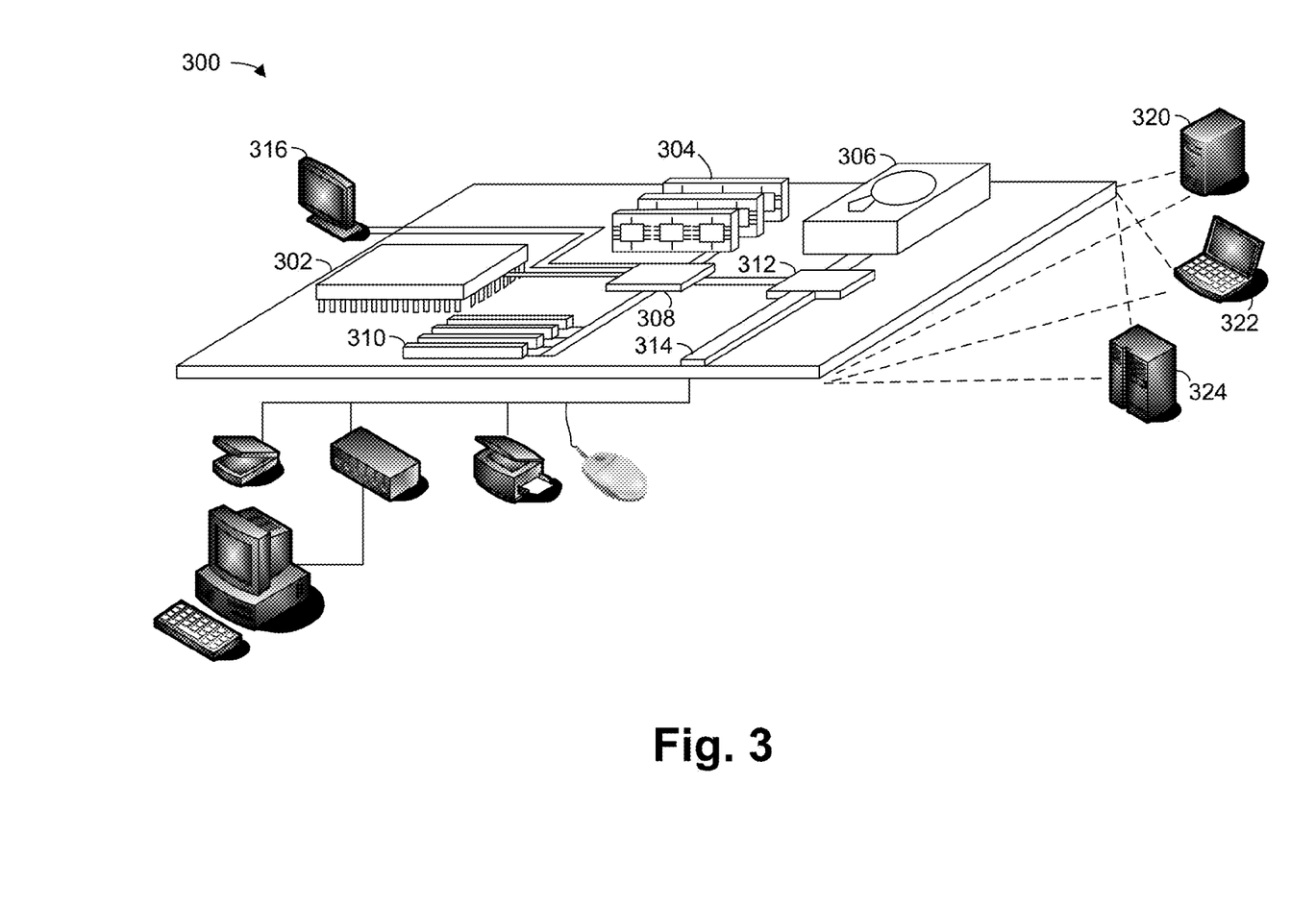
FIG. 3 shows an example of a generic computing device which may be used with the techniques described herein.

FIG. 3 shows an example of a generic computing device 300, which may be used with the techniques described herein. Computing device 300 may correspond to, for example, load balancer 220, storage controllers 230, and/or management device 240. Each of load balancers 220, storage controllers 230, and/or management devices 240 may include one or more computing devices 300.

Computing device 300 is intended to represent various forms of digital computers, such as laptops, desktops, workstations, personal digital assistants, servers, blade servers, mainframes, and other appropriate computers. The components shown here, their connections and relationships, and their functions, are meant to be examples only, and are not meant to limit implementations described and/or claimed in this document.

Computing device 300 may include a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, may be interconnected using various busses, and may be mounted on a common motherboard or in other manners as appropriate. Processor 302 may process instructions for execution within computing device 300, including instructions stored in the memory 304 or on storage device 306 to display graphical information for a graphical user interface (GUI) on an external input/output device, such as display 316 coupled to high speed interface 308. In another implementation, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system, etc.).

Memory 304 may store information within computing device 300. In one implementation, memory 304 may include a volatile memory unit or units. In another implementation, memory 304 may include a non-volatile memory unit or units. Memory 304 may also be another form of computer-readable medium, such as a magnetic or optical disk. A computer-readable medium may be defined as a non-transitory memory device. A memory device may include memory space within a single physical memory device or spread across multiple physical memory devices.

Storage device 306 may provide mass storage for computing device 300. In one implementation, storage device 306 may include a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described below. The information carrier may include a computer or machine-readable medium, such as memory 304, storage device 306, or memory included within processor 302.

High speed controller 308 may manage bandwidth-intensive operations for computing device 300, while low speed controller 312 may manage lower bandwidth-intensive operations. Such allocation of functions is an example only. In one implementation, high-speed controller 308 may be coupled to memory 304, display 316 (e.g., through a graphics processor or accelerator), and to high-speed expansion ports 310, which may accept various expansion cards (not shown). In the implementation, low-speed controller 312 may be coupled to storage device 306 and to low-speed expansion port 314. Low-speed expansion port 314, which may include various communication ports (e.g., USB, Bluetooth, Ethernet, wireless Ethernet) may be coupled to one or more input/output devices, such as a keyboard, a pointing device, a scanner, or a networking device, such as a switch or router, e.g., through a network adapter.

Computing device 300 may be implemented in a number of different forms, as shown in FIG. 3. For example, it may be implemented as a standard server 320, or multiple times in a group of such servers. It may also be implemented as part of a rack server system 324. Additionally or alternatively, computing device 300 may be implemented in a personal computer, such as a laptop computer 322.

Various implementations of the systems and techniques described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and may be implemented in a high-level procedural and/or object-oriented programming language, and/or in assembly/machine language. As used herein, the terms "machine-readable medium" and "computer-readable medium" may refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and techniques described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described herein may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

Although FIG. 3 shows example components of computing device 300, computing device 300 may include fewer components, different components, additional components, or differently arranged components than depicted in FIG. 3. Additionally or alternatively, one or more components of computing device 300 may perform one or more tasks described as being performed by one or more other components of computing device 300.

Prioritized Rate Scheduler

Figure 4:
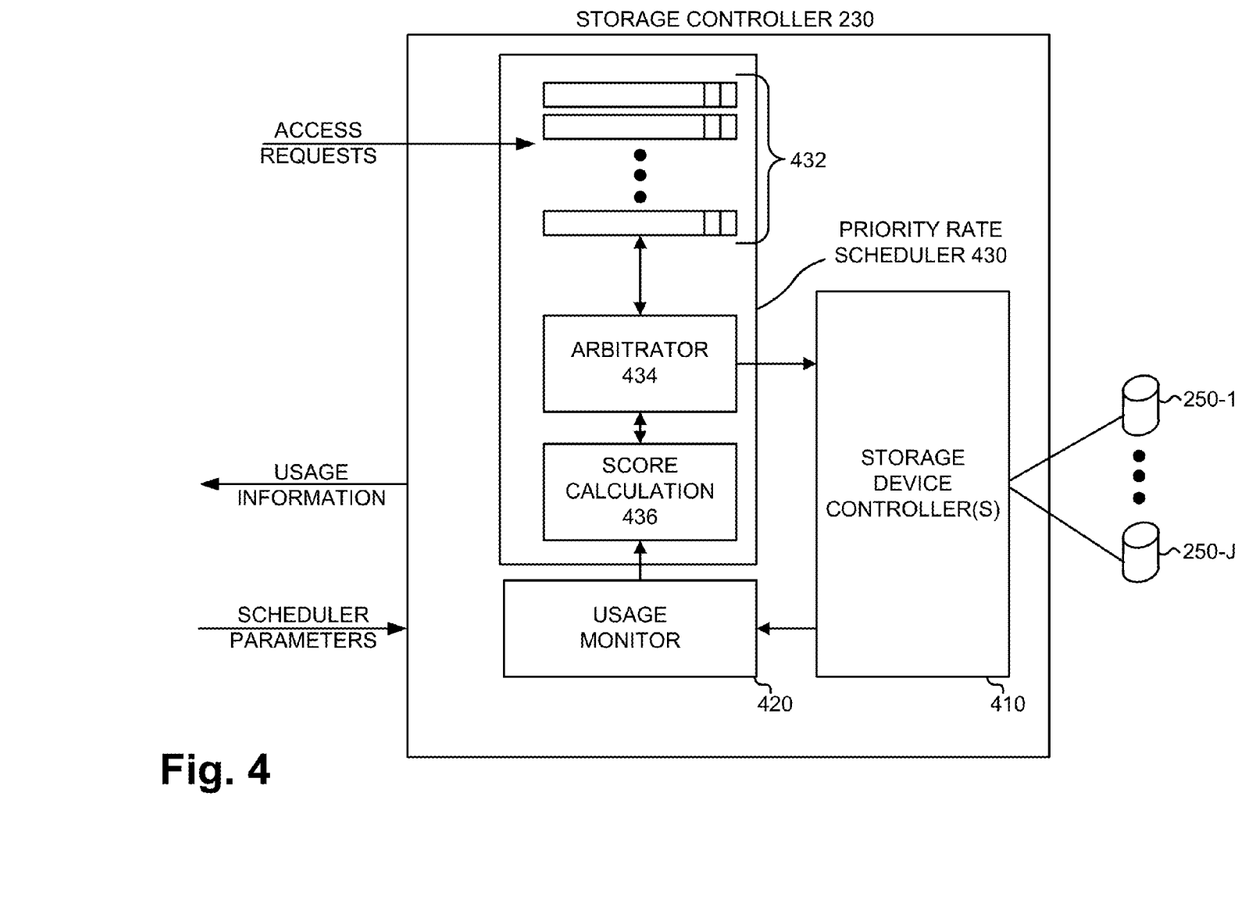
FIG. 4 is a diagram of example functional components of one of the storage controllers shown in FIG. 2.

FIG. 4 is a diagram of example functional components of one of storage controllers 230. Storage controller 230 may include storage device controller(s) 410, usage monitor 420, and priority rate scheduler 430. Each of storage device controller(s) 410, usage monitor 420, and priority rate scheduler 430 may be implemented using one or more of the components of computing device 300, illustrated in FIG. 3.

Storage device controller 410 may provide an interface to storage devices 250. Storage device controller 410 may receive read and/or write commands from priority rate scheduler 430, convert the commands into signals appropriate for the interface provided by storage devices 250, and transmit the signals to storage device 250. Storage device controller 410 may be designed based on the specific protocol implemented by storage devices 250, such as SATA (serial advanced technology attachment), SCSI (small computer system interface), or IDE (Integrated Drive Electronics).

Usage monitor 420 may monitor or record usage of storage devices 250. Usage monitor 420 may transmit the monitored usage information to management device 240, such as by periodically (e.g., every 10 seconds) transmitting messages quantifying the usage of storage devices 250. Alternatively, usage monitor 420 may transmit the monitored usage information to management device 240 in response to polling requests from management device 240. Usage of storage devices 250 may be represented, for example, as the amount of time that a particular user, of a particular priority level or set of priority levels, uses a particular storage device 250. For example, usage monitor 420 may calculate, over a sliding window (e.g., a sliding ten second window), the amount of storage device time that was attributable to a particular queue. Other indications of "usage" of a storage device 250 may alternatively be used, such as the portion (percentage) of the window attributable to a user or queue, the bandwidth written or read by a user or queue, or other measurement indications.

Priority rate scheduler 430 may generally operate to schedule the order of delivery of operations to storage devices 250. Priority rate scheduler 430 may, for example, delay an operation from a low priority user until operations from a high priority user have been handled by a storage device 250. Priority rate scheduler 430 may include queues 432, arbitrator component 434, and score calculation component 436.

Queues 432 may include a number of buffers (e.g., first-in-first-out (FIFO) queues). In one implementation, and as previously mentioned, queues 432 may be implemented on a per-user, per-priority, and per-storage device basis. That is, priority rate scheduler 430 may maintain a separate queue for each combination of a user, priority, and storage device. Incoming operations, received from load balancer 220, may be input to the appropriate one of queues 432.

Arbitrator component 434 may operate to selectively remove operations from queues 432 and forward the operations to storage device controller 410, whenever a storage device 250 is available (i.e., can handle a new operation) and at least one queue 432, corresponding to the available storage device, contains operations. Arbitrator component 434 may determine which queue 432 to select based on a score calculated for each queue 432. For example, arbitrator component 434 may select the queue having a lowest score.

In an alternative possible implementation, arbitrator component 434 may select queues and/or operations based on factors other than selecting the queue having the lowest score. For example, for a system in which storage devices 250/255 include disk drives, arbitrator component 434 may additionally take into account the head location of the disk drives, as it is desirable to minimize the head movement of a disk drive to increase throughput. For instance, arbitrator component 434 may select the queue having a score that is within a certain threshold value of the lowest score and that minimizes disk head movement.

The scores for queues 432 may be maintained by score calculation component 436. Score calculation component 436 may calculate the scores for queues 432 based on parameters received from management device 240 and based on usage information determined by usage monitor 420.

One example technique for calculating scores for queues 432 will now be described. In the description that follows, a user, u, will be described as being potentially associated with a number of priorities. Thus, a user, such as an application, may be given the ability to issue operations having multiple priorities. For example, an application may need to perform certain operations as quickly as possible, such as through high priority operations, while other operations may not be as time sensitive and may be performed using lower priority operations.

The following variables may be defined:
(1) the priority, p, may be defined where $0 \leq p \leq 1$, where one represents the highest priority and zero represents the lowest priority;
(2) disks or number_disks is the total number of storage devices 250/255 (e.g., hard disks) in storage system 200; and
(3) $quota_p(u)$ represents the number of storage devices that have been purchased or assigned to a user, u, at priority, p.

With these definitions, the user's target share of storage system 100, for priority p, may be expressed as $TS_p(u)$, where $$TS_p(u) = \sum_{q \geq p} \frac{quota_q(u)}{number\_disks}. \qquad (Eq. 1)$$

$TS_p(u)$ (or $quota_p(u)$), may be received by storage controller 230 from management device 240. Management device 240 may receive $TS_p(u)$ (or $quota_p(u)$) from an administrator of storage system 200. In some implementations, management device 240 may update $TS_p(u)$ during operation of storage system 100, such as in response to a change in the number of storage devices 250/255 that are included in system 100, updated information from an administrator, or other information.

Given $TS_p(u)$, a maximum allowed local storage device portion (i.e., the maximum allowed usage portion for a storage device 250), for a user, u, at priority, p, may be represented as $LD_p(u)$, and defined as:

$$LD_p(u) = \max(TS_p(u), \mu_p(u) + 2\sigma_p(u));$$

for p>0, and $$LD_0(u)=0;  \quad (Eq. 2)$$

for p=0,
where $\mu_p$ (u) may represent the average portion of the storage device that is used for user, u, at priority, p, and $\sigma_p$ (u) may represent the standard deviation of the portion of the storage device that is used for user, u, at priority, p. In alternative implementations, other calculations for $LD_p$(u), that allow $LD_p$(u) to go over $TS_p$(u), are additionally possible.

With the target usage level, $TS_p$(u), and the maximum allowed usage level, $LD_p$(u), defined, a scoring system may be defined based on:

$$U_p(u)=\Sigma_{q \neq p} \text{usage}_q(u) \quad (Eq. 3)$$

where $\text{usage}_p$(u) may represent the usage over a previous window, such as a ten second window, for this user and priority, as calculated locally by usage monitor 420. Thus, $U_p$ (u) may represent the recent local disk usage at this priority, p, and higher. The score for user, u, at priority, p, may be defined to be:

$$S_p(u) = k(1-p) + \frac{U_p(u)}{TS_p(u)}; \text{ when } U_p(u) < LD_p(u), \quad (Eq. 4)$$

$$S_p(u) = \infty; \text{ otherwise.}$$

Here, k may be chosen as a constant such that $S_p$ (u)<$S_q$ (v) when p>q for all users u and v. The score, $S_p$ (u), for a higher priority operation may, thus, always be less than the score for a lower priority operation. The notation, $S_p$ (u)=∞, may, in practice, be implemented by setting $S_p$ (u) to an arbitrarily high value, or by limiting the value of the variable in which $S_p$ (u) is stored, so that all scores that are calculated using the first equation for $S_p$ (u) will be lower than $S_p$ (u)=∞. Score calculation component 436 may calculate scores corresponding to each of queues 432.

Arbitrator component 434 may select queued operations, corresponding to a storage device 250, as the next operation having the lowest score. In some implementations, if a user's score, $S_p$ (u), is the lowest score, but the user has queued operations at different priorities, arbitrator component 434 may select the operations across the multiple queues of the user using a weighted picking scheme to avoid the situation in which low priority operations may be starved. Weighted picking is described in more detail below.

From the above description of the calculation of the score, it can be seen that $LD_p$ (u), by providing a maximum allowed usage threshold that may be greater than $TS_p$ (u), may allow temporary access bursts at a storage device 250. In one implementation, the $\mu_p$ (u) and $\sigma_p$ (u) values, which are used to calculate $LD_p$ (u), may be calculated as the average and standard deviation of $U_p$ (u). In some implementations, certain priority levels may not be given a target quota (i.e., $TS_p$ (u) may be set to 00 for the highest priority levels). To improve calculation efficiency for these priority levels, instead of calculating $LD_p$ (u) over every priority level, $LD_p$ (u) may not need to be calculated for priority levels that are not assigned a target quota.

When $\mu_p$ (u)>$TS_S$ (u), the total throughput of a user exceeds the purchased or assigned quota of the user. In this situation, a distributed enforcement mechanism may be invoked. In one implementation, $LD_p$(u) may be set to $TS_S$(u). In some implementations, a less drastic enforcement mechanism may be used in which it may be possible to bring the user into compliance with a smaller modification to $LD_p$(u). For instance, if the distribution of operations across storage devices 250 is relatively stable, management device 240 may compute $LD_p$ (u) by solving the following for $LD_p$(u):

$$TS_p(u)*\#disks=\Sigma_{i=0}^{\#disk}=\min(r_i,LD_p(u)), \quad (Eq. 5)$$

where #disks represents the total number of storage devices 250/255 in storage system 200 and $r_i$ represents the usage of a particular user and priority at a storage device i. In one implementation, equation (5) can be computed by sorting the $r_i$'s and computing, for each j≤#disks, the value f(j)=(#disks−j)$r_j$+$\Sigma_{i=0}r_i$. $TS_p$ (u) may then be set to $r_j$, where j is the largest value such that f (j)<$TS_p$ (u)*#disks. In other implementations, additional assumptions about the shape of the user's distribution may allow for a more efficient computation of $LD_p$(u).

Figure 5:
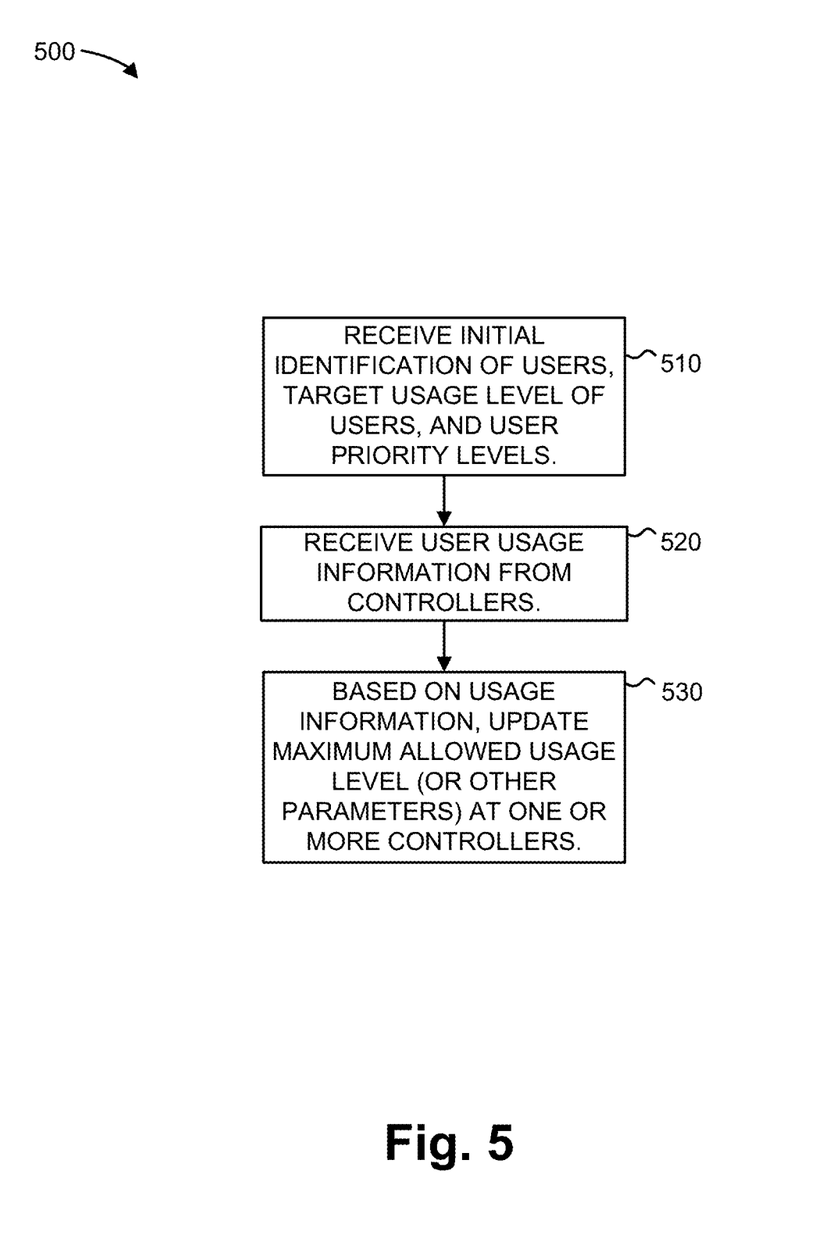
FIG. 5 is a flow chart of an example process for performing priority scheduling.

FIG. 5 is a flow chart of an example process 500 for performing priority scheduling. Process 500 may be performed, for example, by management device 240. In another implementation, some or all of process 500 may be performed by one or more devices separate from, or in combination with management device 240. For example, some or all of processes 500 may be performed by storage controller 230.

Process 500 may include receiving initial parameters relating to the priority scheduling, such as an identification of the authorized users of storage system 200, the target usage levels of the users, and the priority levels of the users (block 510). The initial parameters may be parameters determined by a system administrator or another entity.

An example of a set of initial parameters is given below in Table I. In Table I, four different users and five different user/priority pairs are illustrated. The user "mail_system" may refer to an email application that includes processes that may perform storage operations at different priority levels. The user "research" may refer to a user account given to researchers that tend to perform operations that are not time critical. The user "search_service" may correspond to a search application, such as a web search application. The user "misc_apps" may correspond to one or more other applications that are given access to storage system 200. In this example, the priority level, p, is segmented into three distinct levels: low latency, batch, and best effort. The low latency priority level may refer to the highest priority level. Applications that require fast response times, such as applications that interact, in real-time, with human users, may be assigned this priority level. The priority level "batch" may refer to a priority level below low latency. The priority level "best effort" may refer to the lowest priority level, such as one in which users are not guaranteed any particular level of responsiveness. In terms of the values for p, assume that the priority levels may be assigned as, p=1 for low latency, p=0.9 for batch, and p=0 for best effort. The target usage levels, which may correspond to TS(u), are provided as a percent of system usage. For example, the user "research" may be allocated 5% of the capacity of storage system 200.

TABLE I

| USER | TARGET USAGE | PRIORITY |
| --- | --- | --- |
| mail_system | 15% | low latency |
| mail_system | 10% | batch |
| Research | 5% | best effort |
| search_service | 40% | low latency |
| misc_apps | 30% | batch |

Process 500 may further include receiving usage information from storage controllers 230 (block 520). In one implementation, the usage information may correspond to the previously discussed values $usage_p(u)$. The usage information may be generated periodically be storage controllers 230, such as for every ten second window. Thus, management device 240 may receive messages from storage controllers 230, where each message may include one or more usage values describing the usage of a particular user, at a particular priority level, over the previous window. In one implementation, the usage values may be specified for a particular storage device 250/255. Alternatively, the usage values may be expressed as an average usage level over the set of storage devices connected to a storage controller 230. The usage values may be expressed as, for example, a percentage value, a time value (e.g., 300 milli-seconds of usage), a value based on bandwidth used, etc.

Process 500 may further include, based on the usage information, updating the maximum allowed usage level at storage controllers 230 (block 530). For example, management device 240 may calculate, the $LD_p(u)$ values discussed above using equation (2). If any of these values change from the previous time window, management device 240 may broadcast the updated value(s) to storage controllers 230. At certain times, management device 230 may transmit other parameters to storage controllers 230. For example, the target usage levels may occasionally be updated and broadcast to storage controllers 230. In general, any of the parameters, that are used by storage controllers 230 to implement the prioritized scheduling, may be transmitted to storage controllers 230.

Figure 6:
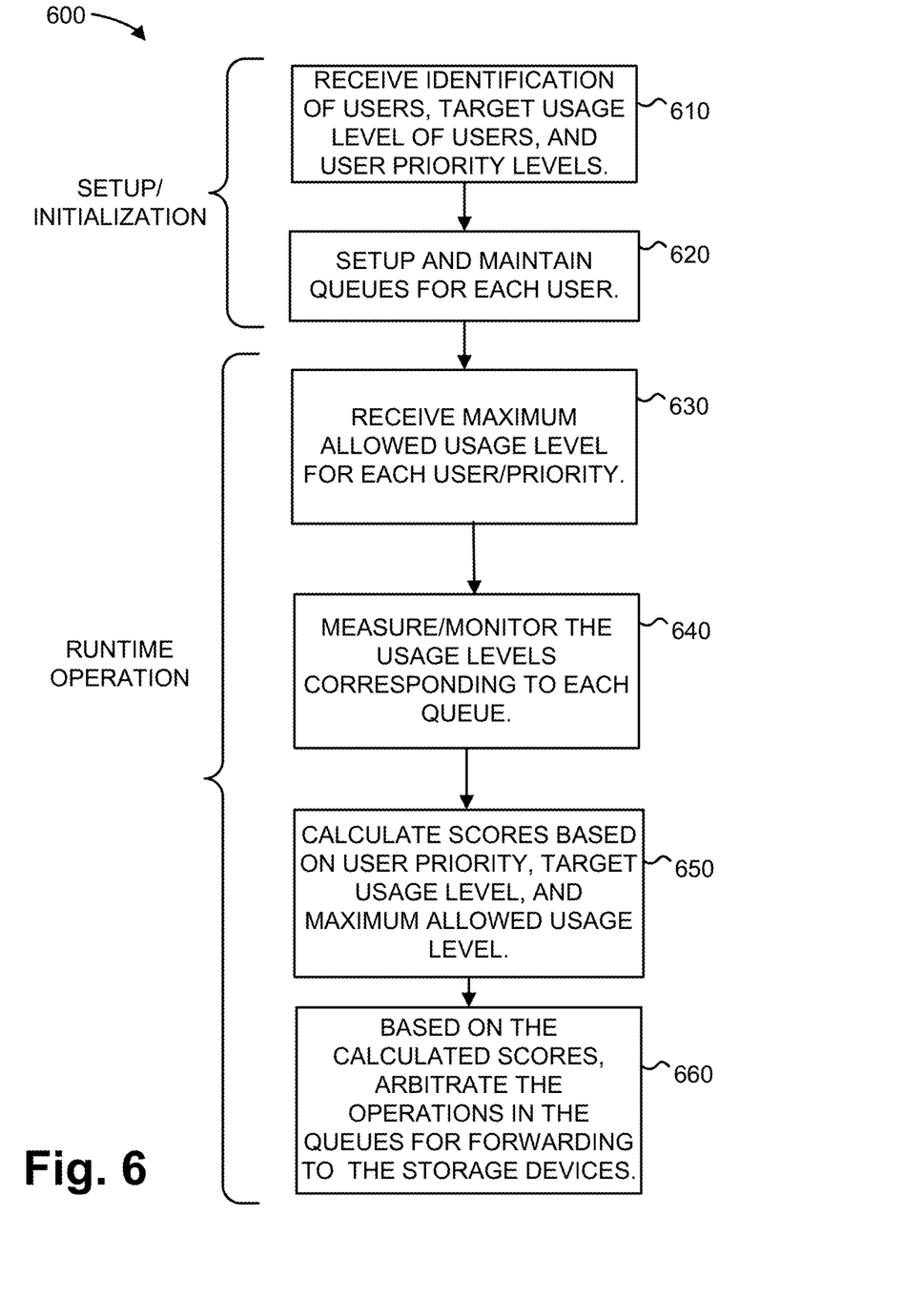
FIG. 6 is a flow chart of an example of another process for performing priority scheduling.

FIG. 6 is a flow chart of an example of another process 600 for performing priority scheduling. Process 600 may be performed, for example, by each of storage controllers 230.

Process 600 may include receiving an identification of the users, target usage levels for each user and priority, and the priority level of each user (block 610). This information may be received from management device 240, such as during initial setup of storage system 200. One example of a set of users, target usage levels, and priority levels is shown in Table I.

Process 600 may further include setting up and maintaining queues 432 for each user (block 620). Queues 432, as previously mentioned, may include FIFO queues and a separate queue may be maintained for each combination of user, priority, and storage device 250/255. Queues 432 may receive incoming operations, from the users, and buffer the operations until the operations are transmitted, for execution, to the corresponding storage devices 250/255. In some alternative implementations, data structures other than FIFO queues may be used.

In one particular implementation, blocks 610 and 620 may be performed during initialization of storage system 200. Alternatively, the operations of blocks 610 and 620 may be performed as a new user is added to storage system 200. Blocks 630, 640, 650, and 660, in contrast, may correspond to operations that are repeatedly performed during runtime operation of storage system 200.

Process 600 may further include receiving the maximum allowed usage level for each user and priority (block 630). The maximum allowed usage level, $LD_p(u)$, may be determined by management device 240 and transmitted to storage controllers 230. For example, management device 240 may periodically calculate, according to equation (2), the maximum allowed usage level. Alternatively, in some implementations, storage controllers 230 may locally calculate and/or modify the maximum allowed usage level, $LD_p(u)$. Additionally, storage controllers 230 may receive other parameters, in addition to the maximum allowed usage level, from management device 240 (e.g., updated target usage levels or other parameters may be received).

Process 600 may further include measuring and/or monitoring the usage levels corresponding to each queue (block 640). For example, usage monitor 410 may monitor the usage, of storage devices 250/255, for each user and priority level. As previously discussed, the usage values may be expressed as a percentage value, a time value, a value based on bandwidth used, etc., that are measured/monitored by usage monitor 410 within a predetermined time window.

Process 600 may further include calculating scores for each user, priority, an storage device (block 650) (i.e., a score may be calculated for each queue 432). As discussed previously, in one implementation, the calculated scores, $S_p(u)$, may be based on each user's priority level, target usage level, measured usage level (e.g., as measured in block 640), and maximum allowed usage level (block 650). The scores, $S_p(u)$, may be calculated, for example, using equation (4).

Process 600 may further include selecting among the received storage operations, such as those stored in queues 432, based on the calculated scores (block 660). For example, arbitrator component 434 may select the operations from the queues 432, for a particular storage device 250/255, in an order based on the scores for the queues (e.g., the operation, in the queue with the lowest score, may be selected first). The selected operation may then be forwarded to the storage device 250/255 corresponding to the queue from which the operation was selected.

A number of modifications may be made to the basic arbitration scheme of simply selecting queues, that include queued operations, based on the scores, $S_p(u)$. For example, once a queue is chosen by arbitrator component 434, it may normally be desirable to run the highest priority operation from the user but occasionally it may desirable to run a lower priority operation, from the same user, in order to avoid starvation of the user's lower priority operations. A number of scheduling techniques may be used to choose per-priority queues from the queues for a particular user's queues. For example, a self-clocked fair queuing (SCFQ) technique may be used. Alternatively, other techniques, such as start-time fair queuing (SFQ) or a weighted fair queuing (WFQ) may be used. SCFQ and SFQ, in particular, may differ by whether they rank operations based on virtual start times or virtual finish times of the operations. Both SCFQ and SFQ may achieve relatively equal fairness but SCFQ may allow queues with higher priority operations to burst but may then starve that flow while servicing other computing queues. Yet another scheduling technique that may potentially be used in place of SCFQ, SFQ, or WFQ, includes a weighted round robin (WRR) technique.

In the scheduling technique described above, a single usage rate window may be used to schedule operations from users having multiple different priorities. Higher priority operations may be prioritized to allow the higher priority operations to achieve lower latency, which may be an important factor for certain classes of applications. Further, with the techniques described above, even though a target usage rate is set, higher priority operations from a user may continue to be serviced over lower priority operations up until the user exceeds the maximum allowed usage rate. Further, with the technique described herein, operations of the same priority are not necessarily treated the same. For instance, the prioritized scheduling may favor users who have not recently run operations. This may allow users to see better latency by keeping their queues short and underutilizing their allotted usage quota.

Figure 7:
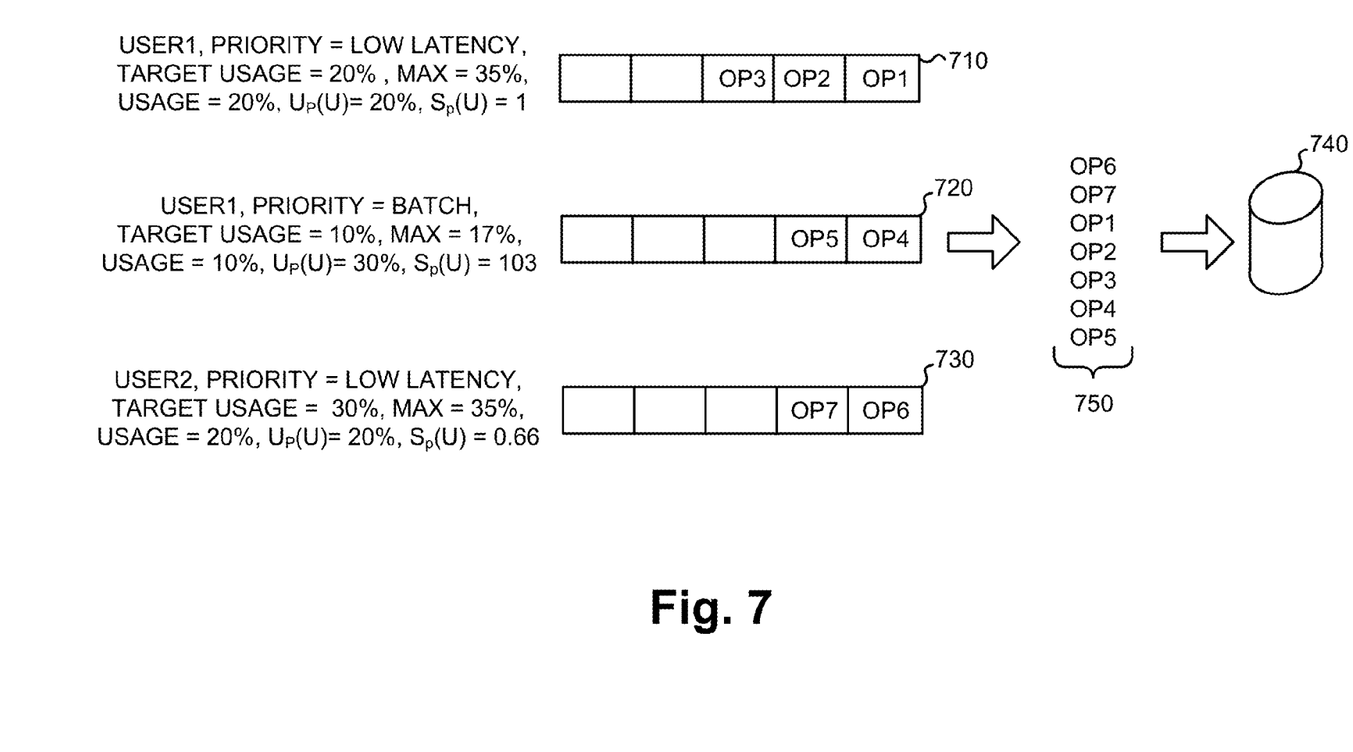
FIGS. 7 and 8 are diagrams illustrating examples of the operation of a prioritized rate scheduler.

An example of the operation of the priority rate scheduler 430 will be discussed with reference to FIG. 7. FIG. 7 is a diagram illustrating three example queues 710, 720, and 730, which may correspond to a disk drive 740. As illustrated, queue 710 may be a queue for the user, USER1, and may correspond to a high priority (LOW LATENCY) queue. Queue 720 may include a second queue for USER1, although queue 720 may correspond to lower priority operations (BATCH) from USER1. Queue 730 may be a queue for the user, USER2, and may correspond to a high priority (LOW LATENCY) queue. As is further shown in FIG. 7, assume that queue 710 is assigned a target usage of 20%, queue 720 is assigned a target usage of 10%, and queue 730 is assigned a target usage of 30%. The maximum allowed usage values, which may be received from management device 240, are illustrated as 35% (queue 710), 17% (queue 720), and 35% (queue 730).

Usage monitor 410 may measure actual usage of disk drive 740. For this example, assume that actual usage is expressed as a percent of time, over the measurement window, at which operations from a particular queue are being serviced by disk drive 740. The measured usage values for the latest window are illustrated as 20% (queue 710), 10% (queue 720), and 20% (queue 730). $U_p(u)$, which may represent the usage by a user at a particular priority and higher, may correspondingly be calculated as 20% (queue 710), 30% (queue 720), and 20% (queue 730). None of the $U_p(u)$ values are greater than the corresponding maximum allowed usage values, accordingly the scores, $S_p(u)$, may be calculated, using equation (4) and assuming a value for k of 1000, as: 1000*(1−1)+20/20=1 (queue 710), 1000*(1−0.9)+30/10=103 (queue 720), and 1000*(1−1)+20/30=0.66 (queue 730). Accordingly, operations from queue 730 may be serviced first, followed by operations from queue 710. In some implementations, when servicing operations from queue 710, a technique such as SCFQ may be used to occasionally also service operations from queue 720, to ensure that queue 720, which corresponds to the same user as queue 710, is not starved. An example of the selected order of the operations in queue 710, 720, and 730 as shown by ordered list 750, in which operation OP6 is the first executed operation and operation OP5 is the last.

In the example above, all of the operations were selected based on a single calculation of the scores $S_p(u)$. Alternatively, the scores may be constantly updated (or updated at some small interval), in response to changing usage values for disk drive 740. Each updating of the scores may correspond to a potential change in the selection order of the operations still in queues 710-730.

Figure 8:
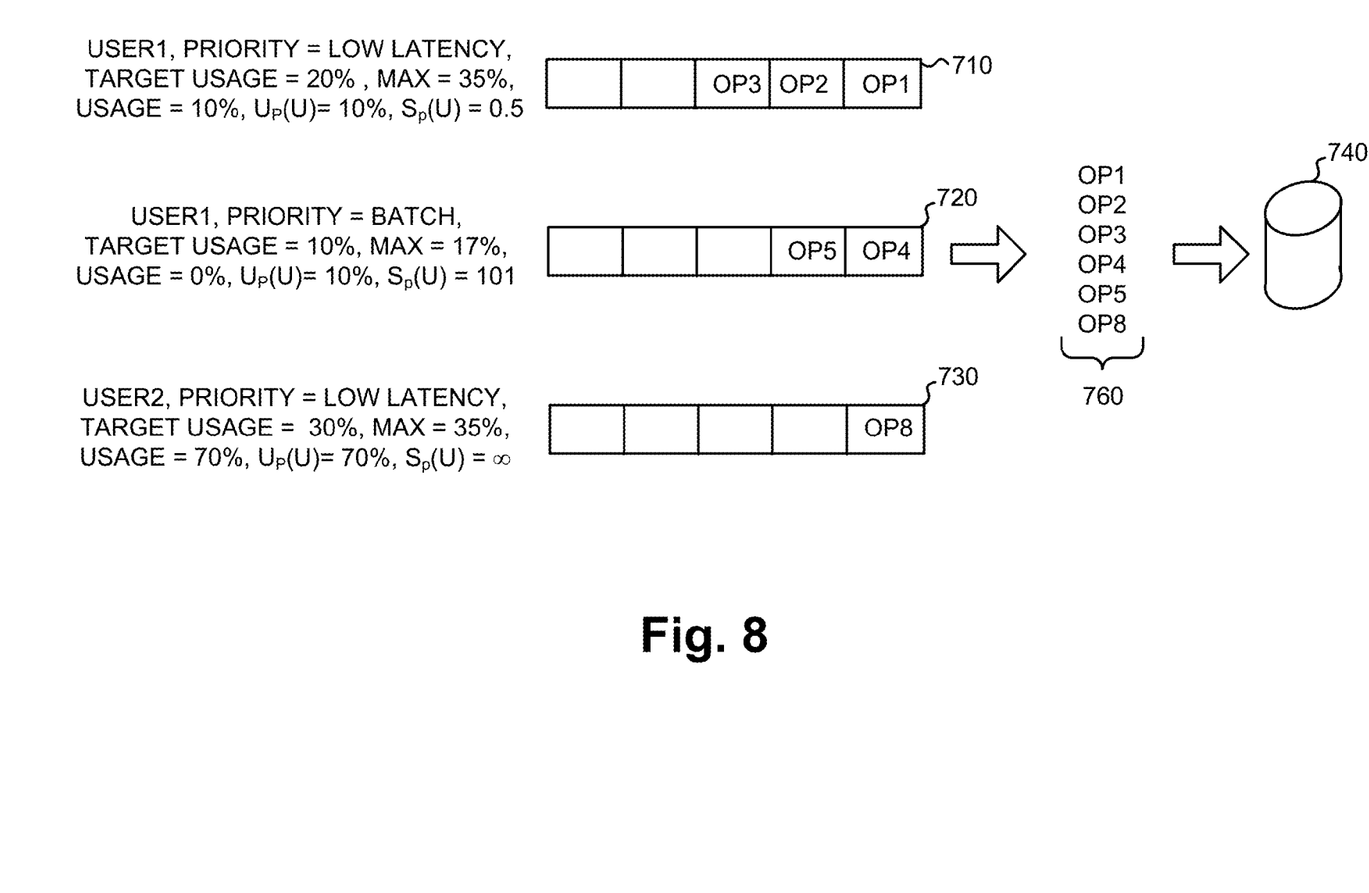

A second example of the operation of the prioritized rate scheduler will be discussed with reference to FIG. 8. FIG. 8 is a diagram illustrating the queues 710, 720, and 730, and disk drive 740, as shown in FIG. 7. For FIG. 8, however, assume that operations OP6 and OP7, from queue 730, have executed, and a new operation, OP8, was received for queue 730. Assume monitored usage levels may now be 10% (queue 710), 0% (queue 720), and 70% (queue 730). $U_p(u)$, which may represent the usage of a user at a particular priority and higher, may correspondingly be calculated as 10% (queue 710), 10% (queue 720), and 70% (queue 730). Queue 730, for which $U_p(u)$ is now greater than the maximum allowed usage of queue 730, may have its score, $S_p(u)$, set to an arbitrarily high value (shown as ∞). The scores for queues 710 and 720 may be calculated as: 1000*(1−1)+10/20=0.5 (queue 710) and 1000*(1−0.9)+10/10=101 (queue 720). Accordingly, operations from queue 710 may be serviced first, followed by operations from queue 720. Queue 730, which has exceeded its maximum allowed usage, may be cutoff until all the other queues are empty (or until the usage of queue 730 is recalculated and the calculated usage is below the maximum allowed value). An example of the selected order of the operations in queue 710, 720, and 730 is shown by ordered list 760, in which operation OP1 is the first executed operation and operation OP8 is the last.

A number of variations can be made to the techniques discussed above. For example, $U_p(u)$ may be modified to penalize users for recent use of lower priorities. $U_p(u)$ may be modified as:

$$U_p(u) = \sum_{q \geq p} \text{usage}_q(u) + \sum_{q < p} q * \text{usage}_q(u).$$

As another example, for higher priorities, $\Sigma_u \text{LD}_P(u)$ may be bounded so that higher priorities do not starve lower priorities even when all of the higher priorities are active on a storage device 250/255. As another example, instead of adding $2\sigma_p$ in the calculation of maximum allowed usage (equation (2)), other techniques for computing outliers could be used. As another example, the maximum allowed usage calculation could be rounded up, such as:

$$\max(TS_p(u), \mu_p(u) + 2p\sigma(u)).$$

The foregoing description provides illustration and description, but is not intended to be exhaustive or to limit the embodiments to the precise form disclosed. Modifications and variations are possible in light of the above disclosure or may be acquired from practice of these embodiments.

For example, while series of blocks have been described with regard to FIGS. 5 and 6, the order of the blocks may be modified in other implementations. Further, non-dependent blocks may be performed in parallel. In addition, other blocks may be provided, or blocks may be eliminated, from the described flow charts, and other components may be added to, or removed from, the described systems.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

It should be emphasized that the term "comprises/comprising," when used in this specification, is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementation includes each dependent claim in combination with every other claim in the claim set.

No element, act, or instruction used in the present application should be construed as critical or essential to the disclosed embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
  receiving, by one or more devices, priority scheduling parameters, the priority scheduling parameters including a target usage level of a user at a priority level;
  receiving, by the one or more devices, usage information from a storage controller, the usage information including information regarding an average portion of a storage device that is used for the user at the priority level;
  calculating, by the one or more devices, a maximum allowed usage level at the priority level using the priority scheduling parameters and the usage information;
  determining, by the one or more devices, that the maximum allowed usage level changed from a previous window of time, and
  transmitting, by the one or more devices and to the storage controller, information about the maximum allowed usage level after determining that the maximum allowed usage level changed from the previous window of time.

2. The method of claim 1, where the priority scheduling parameters further include information identifying users that are authorized to use a system that includes the storage device, and where the users include the user.

3. The method of claim 1, where the priority level includes one of a low latency level, a batch level, or a best effort level.

4. The method of claim 1, where the usage information is for a particular window of time.

5. The method of claim 1, where the usage information further includes a particular percentage, a time value, or a value determined by bandwidth used.

6. The method of claim 1, where the usage information further includes an average usage level over a set of storage devices that are connected to the storage controller, and where the set of storage devices include the storage device.

7. The method of claim 1, where calculating the maximum allowed usage level comprises:
  determining a particular value that represents a portion of the storage device that is used based on the usage information,
  determining a standard deviation of the particular value, and
  determining the maximum allowed usage level using the standard deviation of the particular value and the priority scheduling parameters.

8. A system comprising:
  one or more processors to:
    receive priority scheduling information,
    the priority scheduling information including a target usage level of a user at a priority level;
    receive usage information that includes information regarding an average portion of the particular storage device that is used for the user at the priority level;
    determine a maximum allowed usage level at the priority level using the priority scheduling information and the usage information;
    determine that the maximum allowed usage level changed from a previous window of time; and
    transmit, to a storage controller, information about the maximum allowed usage level after determining that the maximum allowed usage level changed from the previous window of time.

9. The system of claim 8, where the usage information includes information for a particular window of time.

10. The system of claim 8, where the storage device is connected to the storage controller.

11. The system of claim 8, where the priority level includes one of a low latency level, a batch level, or a best effort level.

12. The system of claim 8, where, when determining the maximum allowed usage level, the one or more processors are to:
  determine a standard deviation value based on the usage information, and
  determine the maximum allowed usage level using the standard deviation value and the priority scheduling information.

13. The system of claim 12, where, when determining the standard deviation value, the one or more processors are to:
  determine, based on the usage information, a particular value that represents a portion of the particular storage device, and
  determine the standard deviation value using the particular value.

14. A non-transitory computer-readable medium storing instructions, the instructions comprising:
  one or more instructions that, when executed by at least one processor, cause the at least one processor to:
    receive a target usage level of a user at a priority level;
    determine an average portion of a storage device that is used for the user at the priority level;
    determine a maximum allowed usage level at the priority level using the target usage level and the average portion of the storage device that is used for the user;
    determine that the maximum allowed usage level changed from a previous window of time; and
    transmit, to a storage controller that is connected to the storage device, information about the maximum allowed usage level after determining that the maximum allowed usage level changed from the previous window of time.

15. The non-transitory computer-readable medium of claim 14, where the one or more instructions to determine the maximum allowed usage level comprise: one or more instructions that, when executed by the at least one processor, cause the at least one processor to:
  determine a standard deviation of the portion of the storage device that is used for the particular user, and
  determine the maximum allowed usage level using the target usage level and the standard deviation.

16. The non-transitory computer-readable medium of claim 14, where the priority level includes one of a low latency level, a batch level, or a best effort level.

17. The non-transitory computer-readable medium of claim 14, where the maximum allowed usage level is for a particular window of time.

18. The non-transitory computer-readable medium of claim 14, where the user is authorized to use a system that includes the storage device.

* * * * *